Aug. 1, 1967 D. PRICE-STEPHENS 3,333,654
MOTOR VEHICLE SUSPENSION
Filed Feb. 3, 1965 4 Sheets—Sheet 4
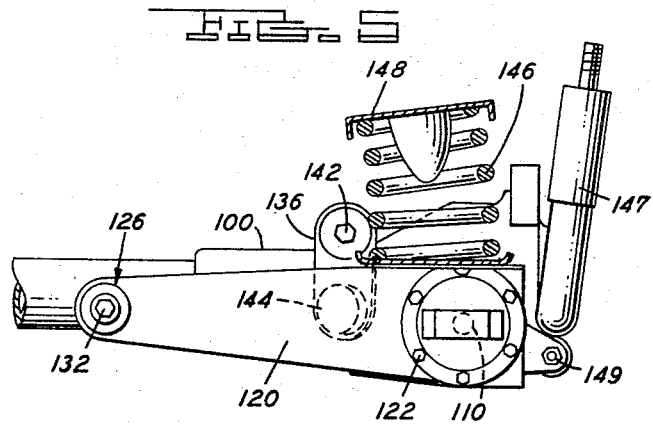
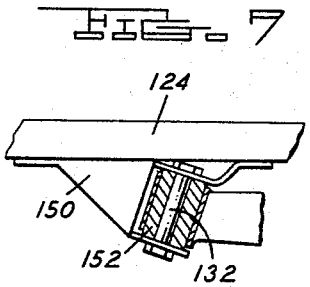
DOUGLAS PRICE-STEPHENS
INVENTOR
BY *John R. Faulkner*
*Clifford L. Sadler*
ATTORNEYS

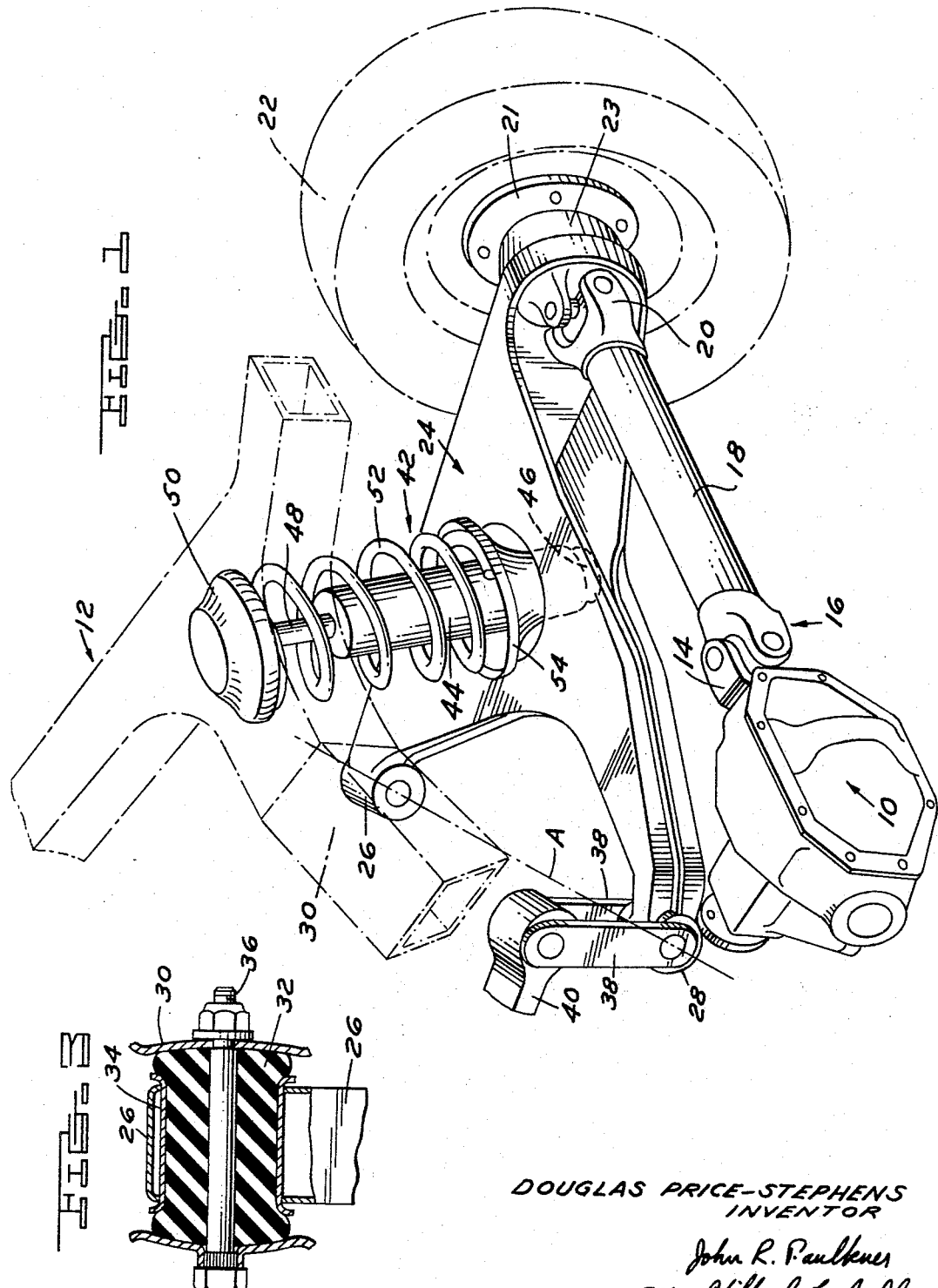

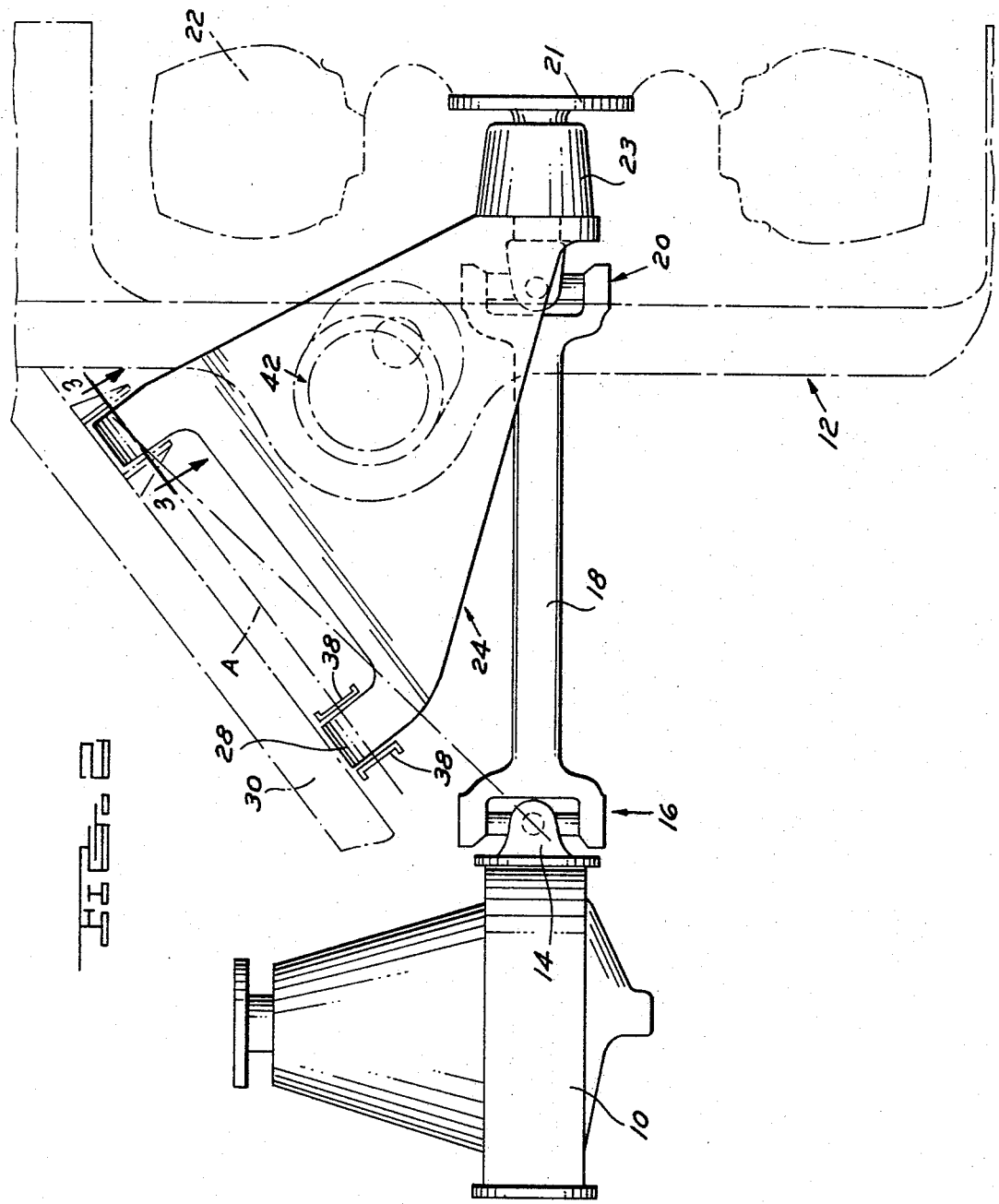

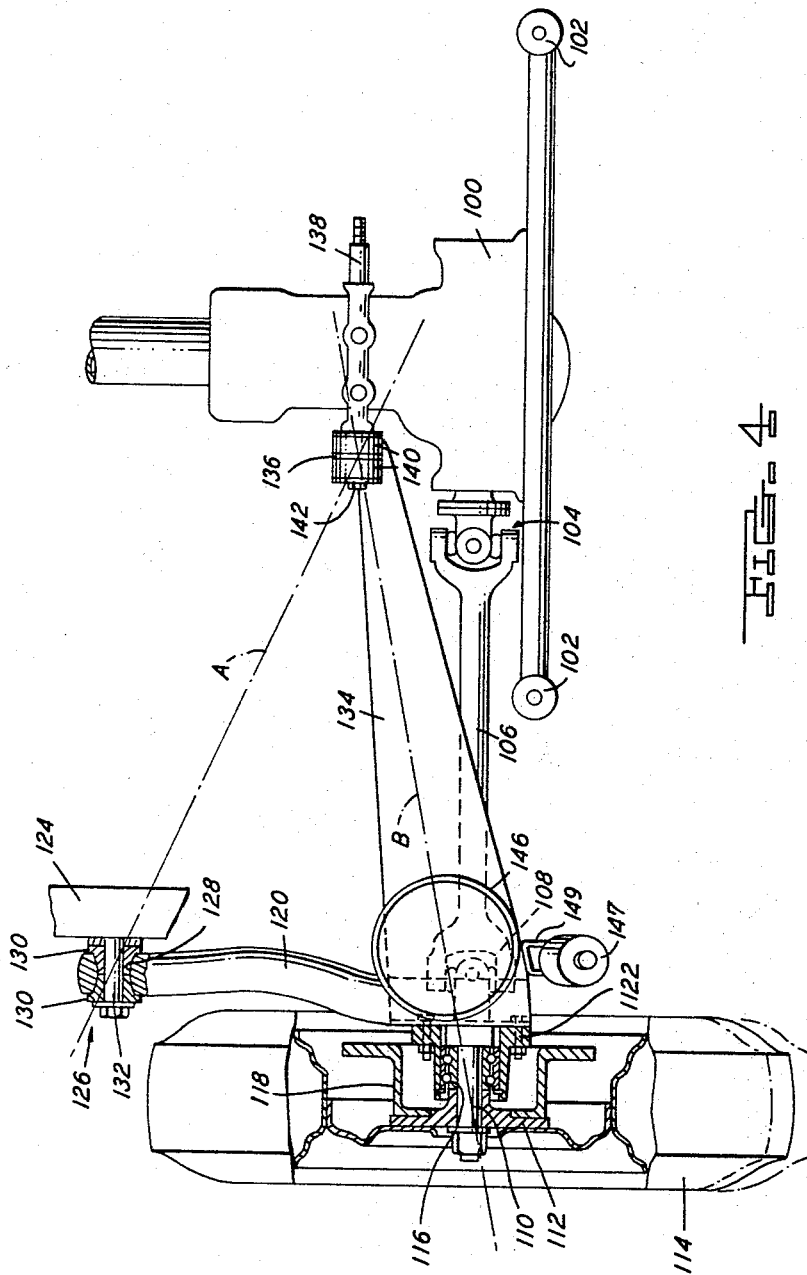

United States Patent Office 3,333,654
Patented Aug. 1, 1967

3,333,654
MOTOR VEHICLE SUSPENSION
Douglas Price-Stephens, Brentwood, England, assignor to The Ford Motor Company, Dearborn, Mich., a corporation of Delaware
Filed Feb. 3, 1965, Ser. No. 431,775
Claims priority, application Great Britain, Apr. 16, 1963, 14,724/63
7 Claims. (Cl. 180—73)

The present application for Letters Patent is a continuation-in-part of my earlier filed application Ser. No. 352,469, filed Mar. 17, 1964 and entitled "Motor Vehicle Suspension," and since abandoned.

This invention relates generally to suspensions for motor vehicles, and has particular application to independent suspension for driving wheels.

In a motor vehicle independent suspension system according to the presently preferred embodiment of this invention, a driving axle shaft of fixed length is connected at its outer end to a road wheel by a universal joint and at its inner end to the sprung mass of the vehicle for swinging movement in a generally vertical plane relatively to the sprung mass.

The wheel is supported and positioned by a wheel support arm. The wheel support arm has two spaced apart portions by which it is attached to the sprung mass along a pivot axis that is inclined to the longitudinal axis of the vehicle. The axis of the support arm is chosen so as not to intersect the connection at the inner end of the fixed length shaft and so that desired camber and steer characteristics are obtained.

According to the present invention, means are provided to permit arm movements necessitated by the fact that the arm pivot axis does not pass through the inner connection of the fixed length shaft. In the presently preferred embodiment, such means comprises a connection for universal pivotal movement where the outer one of the two spaced arm portions is attached to the sprung mass and a connection for relative displacement at the inner portion.

The outer connection may be a ball joint or, conveniently, a resilient bushing. Advantageously, the relative movement at the position of attachment of the inner spaced portion of the wheel support arm is permitted by a link that is pivotally connected to the sprung mass and to the arm portion.

Since during its operation the link swings in an arc about its connection to the sprung mass, it is necessary with such an arrangement that rotational movement as well as universal movement be permitted at the position of connection of the outer spaced portion of the support member to the sprung mass. This is accommodated by the ball joint or resilient bushing.

Since the road wheel is connected to the sprung mass through a fixed length shaft and relative rotation or displacement of the arm pivot axis is permitted by the link, steering changes occur at the road wheel. The magnitude of the change in steering characteristic of the road wheel is determined by the amplitude of the movement of the arm's inclined pivot axis.

Since the pivot axis of the support arm is inclined to the longitudinal direction of the vehicle, relative rotation between the wheel support arm and the sprung mass at the inclined pivot axis also produces changes in camber angle of the road wheel. The magnitude of camber angle change for a given amplitude of relative rotational movement is also determined by the position of the axis.

The steering change and wheel camber change characteristics can be readily modified to suit vehicle design requirements by changing the position of the inclined axis and/or the position and length of the fixed length shaft.

Given the positions of attachment of the two spaced portions of the wheel support arm to the sprung mass, the plane of the road wheel under static conditions is defined. Since the positions of attachment of the two spaced portions of the wheel support arm are well spaced from the wheel hub, small variations in the attachment positions due to manufacturing tolerances have little effect on the setting of the plane of the wheel.

The invention is hereinafter particularly described with reference to the accompanying drawings in which:

FIGURE 1 is a perspective view of an independent suspension for a right rear road wheel embodying the present invention;

FIGURE 2 is a top plan view of the suspension of FIGURE 1;

FIGURE 3 is a section view taken along section line 3—3 of FIGURE 2;

FIGURE 4 is a top plan view of a modification of the suspension shown in FIGURES 1, 2, and 3;

FIGURE 5 is a side elevational view, partly in section, of the suspension of FIGURE 4;

FIGURE 6 is an elevational view of the link which connects the inner end of the suspension arm with the chassis; and FIGURE 7 is a plan view illustrating an alternate construction for one of the pivots of FIGURE 4.

Referring now to the drawings for a more complete understanding of the invention, FIGURES 1 and 2 disclose an independent rear suspension for a driven wheel. A differential gear case 10 is secured by brackets (not shown) to the frame member 12 of a vehicle chassis. The differential 10 receives power from the engine and delivers it to the left and right road wheels. The right-hand output of the differential 10 is connected to a yoke 14 of a universal joint 16. The joint 16, in turn, is connected to a half shaft 18. A universal joint 20 joins the outer end of the half shaft 18 with the hub 21 of a road wheel 22.

A wheel support arm 24 is secured to the bearing housing 23 that rotatably supports the hub 21 of the wheel 22. The forward end of the support arm 24 has spaced portions 26 and 28. The outer spaced portion 26 is connected to the cross member 30 of the vehicle frame 12 by the bushing structure shown in FIGURE 3. As disclosed in that view, a resilient bushing 32 is surrounded by a metal sleeve 34 to which the eye formed at portion 26 of arm 24 is secured. The bushing 32 is secured to the frame member 30 for pivotal movement by a pivot bolt 36. Due to the resiliency of the bushing 32, the arm 24 may pivot about the axis which passes through the center of the bolt 36 and, in addition, by deformation of the rubber 32, the arm 24 is capable of horizontal pivotal movement about the center of the bushing.

The inner spaced portion 28 is provided with an eye that receives a bushing to which a pair of shackles or links 38 are connected. The upper ends of the links 38, in turn, are secured to a bracket 40 that is connected to the frame cross member 30.

Resilient support of the chassis upon the suspension is provided by a coil spring and shock absorber unit 42. This unit comprises a telescopic shock absorber 44 that has its lower end connected at 46 to the support arm 24. The piston rod portion 48 is connected to a special spring seat 50 that is mounted in the vehicle frame 12. The mount 50 comprises a pair of cup-shaped metal stampings having a separating rubber layer that provides vibration isolation. A coil spring 52 surrounds the shock absorber 44 and its upper end is mounted in the spring seat 50. The lower end of the spring 52 is connected to a spring seat 54 which is secured to the body of the shock absorber 44.

The spring 52 functions, not only to support the sprung mass of the vehicle on the suspension, but it also loads the link 38 in tension which tends to keep it in vertical alignment.

The lateral position of the wheel 22 is determined by the fixed length half shaft 18. The axis of the wheel 22 is fixed with respect to the support arm 24 which is secured to the bearing housing 23 and, therefore, camber and steering angle are determined by the attitude of the arm 24. These characteristics will change during suspension deflection becauses the axis A does not intersect the inner universal joint 16.

The outer universal joint 20 traverses an arcuate path having the inner joint 16 as its center during jounce and rebound movement. The path of joint 20 does not coincide with the arcuate path of the rear end of the arm 24 as determined by its pivot axis A. Thus, when the wheel 22 and the joint 20 move upwardly during jounce, the links 38 will articulate to permit the arm 24 to follow the path dictated by the half shaft 18. This articulation will change the attitude of the arm 24 and the camber and steering angle of the wheel 22.

Movement of the inner arm portion 28 away from the static position of axis A is permitted by the resilient bushing 32 of the outer spaced portion 26. In place of a resilient bushing, portion 26 of arm 24 might be supported by a ball joint assembly.

Since the half shaft 18 has a fixed length, relative movement of the axis A about the bushing 32 when the links 38 articulate is constrained to rotation in a counterclockwise sense in FIGURE 2 upon jounce or rebound movement starting from design height or the static position of the suspension.

Since the wheel support arm 24 is connected at its inner portion 28 to the subframe 30 by the links 38, a vertical as well as horizontal component of movement is given to that portion of the support arm 28 as the links 38 rotate in an arc.

As a result of the displacement of axis A and the corresponding movement of the wheel support arm 24, a change is produced in the steering characteristics of the road wheel 22. The wheel 22 and its axis of rotation are fixed with respect to the arm 24. Thus, when the link 38 permits the arm 24 to change its attitude to accommodate jounce and rebound movement of the half shaft 18, the plane of rotation is changed. The magnitude of the change in steering characteristics is determined by the amplitude of movement of axis A.

It also follows that the inclination of axis A determines the camber change. By a suitable choice of inclination, desired wheel camber changes can be related in a desired manner to road wheel steer characteristic changes.

The link 38 swings through an arc, causing the adjacent portion 28 of the arm 24 to be displaced both vertically and horizontally. The vertical displacement effects the camber angle and the horizontal movement effects a change in steering angle.

The position of adjustment of the portions 26 and 28 are well spaced from the hub of the wheel 22 and, therefore, small variations in the attachment locations due to manufacture tolerances have little effect on the setting of the plane in the wheel 22.

As above described, the suspension is designed to produce understeer at the road wheel upon body roll. The suspension can, however, be designed to give an oversteer characteristic if desired. The foregoing description presents the presently preferred embodiment of this invention.

FIGURES 4, 5, 6 and 7 illustrate an alternate form of the present invention. In this modification, a differential gear unit 100 is connected to the vehicle chassis by spaced apart resilient mounts 102. A universal joint 104 connects the output of the differential 100 to an axle shaft 106 of fixed length. A universal joint 108 is situated at the outer end of the axle shaft 106 and connects it to a stub shaft 110. A wheel hub 112 is secured to the stub shaft 110 and supports a road wheel 114. A span of roller bearings 116 rotatably support the stub shaft 110 and are carried by a bearing housing 118. A longitudinally extending suspension arm 120 is secured to the bearing housing by bolts 122.

The forward end of the suspension arm 120 is secured to an element 124 of the vehicle frame by a pivotal connection 126. The pivotal connection 126 includes an eye 128 which is formed at the end of the suspension arm 120. A pair of annular rubber bushings 130 are fitted into the eye 128. A pivot bolt 132 is positioned through the center of the annular bushings 130 and is secured to the frame member 124.

A second suspension arm 134 has its outer end bolted, welded, or otherwise secured to the longitudinal arm 120. The arm 134 runs in a generally transverse direction and has its inner end connected to the sprung components. More specifically, a link 136 is pivotally connected to a bolt-like bracket 138 that is secured to the differential housing 100. The link 136 is positioned by a pair of rubber bushings 140 and a nut 142. The lower end of the link 136 is pivotally connected to the end of the suspension arm 134 by a resilient bushing which contains a pivot bolt 144. The pivot bracket 138 defines the pivot axis for the upper end of the link 136. That axis is arranged to be generally transverse of the vehicle.

The pivot bolt 144 defines the pivot axis for the connection between the lower end of the link 136 and the inner end of suspension arm 134. The link 136 is twisted so that the pivot axis which passes through bolt 144 is in alignment with the axis line A which passes through the bushing connection for the longitudinal arm 120 and the lower end of the link 136. As in the embodiment of FIGURES 1 and 2, the pivot axis A of FIGURE 4 does not pass through the center of the universal joint 104 of the axle shaft 106.

A coil spring 146 is seated on the suspension arm 134. The upper end of the coil spring 146 is connected to a spring seat 148 carried by the chassis of the vehicle. The center of the coil spring 146 is located in a generally vertical plane which passes through the center of the bushing 140 and the center of the wheel 114. Line B in FIGURE 4 represents the vertical plane. With this arrangement, the forward pivot 126 for the arm 120 is free of vertical load. All of the sprung weight carried by the spring 146 is supported by the link 136. Thus the spring force tends to restrict and control the movement of the link 136. The only vertical loads which the bushing connection 126 carries are those which result from acceleration and braking and those that might be caused by jounce and rebound movement of the wheel when it strikes irregularities in the pavement.

A shock absorber 147 is connected at its lower end to a bracket 149 extending from the suspension arm structure. The upper end of the shock absorber 147 is secured to the chassis frame.

The operation of the suspension of FIGURES 4, 5, and 6 is generally similar to that which has been described in connection with the embodiment of FIGURES 1, 2, and 3.

The axis of the pin 132 which forms a part of the resilient connection 126 extends generally perpendicular to the longitudinal frame element 124. As a result, the conical bushings 130 are subject to large axial as well as radial loads particularly during cornering maneuvers. The resilient axial compression of the bushings 130 has the effect of increasing the radial spring rate of the bushings so that the compliance permitted by the suspension varies. The compression of the flanges on the bushings increases the road noise transmitted through the resilient bushings from the suspension. These drawbacks may be reduced by mounting the pivot pin 132 at an angle to the side member so that during cornering substantially no axial loads are imposed on the resilient bushings 130. Such an arrangement is shown in FIGURE 7 where the pivot pin 132 is shown mounted on a bracket 150. The bushing 152 is tubular and since axial loads are substantially eliminated, flanges for locating the tubular portion of this support member for suspension arm 120 are unnecessary.

As previously noted, the embodiment in FIGURES 4, 5, and 6 operates in the same general fashion as the embodiment of FIGURES 1, 2, and 3. The resilient bushings at the forward end of suspension arm 120 provides a compliance feature. That is, the wheel 114 is permitted to recede slightly or move in a fore and aft direction when it strikes an obstacle in the road. This is referred to by those skilled in the art as wheel compliance. The suspension of FIGURE 1, where the bushing 32 is interposed at the connection of arm portion 26 with the chassis, also permits wheel compliance. In the embodiment of FIGURE 4 the coil spring 146 does not load the bushing 130 and therefore it does not interfere with the compliance function of that element.

Alterations and modifications may occur to those skilled in the art that will come within the scope and spirit of the following claims.

I claim:

1. A vehicle suspension having a frame, a differential gear unit secured to said frame, a driving wheel laterally spaced from said gear unit, an axial shaft, an inner universal joint connecting said shaft with the output of said differential gear unit, an outer universal joint drivingly connecting said shaft to said wheel, a rigid suspension arm having a support portion supporting said wheel for rotary motion about an axis fixed with respect to said arm, said arm having spaced first and second pivot portions, first pivot means connecting said first pivot portion to said frame and constructed to support said first pivot portion for jounce and rebound pivotal movement of said arm, said first pivot means being further constructed to support said first pivot portion for lateral pivotal movement of said arm about a vertical axis passing through said first pivot means, means connecting said second pivot portion of said arm to said frame, said just mentioned means including second pivot means constructed to support said second pivot portion for jounce and rebound pivotal movement of said arm and support means constructed to support said second pivot means for horizontal displacement along an arcuate path relative to said frame upon jounce and rebound movement of said arm, a suspension spring interposed between said arm and said frame, said pivot portions having a common pivot axis displaced from said inner universal joint.

2. A vehicle suspension system having a frame, a differential gear unit secured to said frame, a driving wheel laterally spaced from said gear unit, an axle shaft, an inner universal joint connecting said shaft with the output of said differential gear unit, an outer universal joint drivingly connecting said shaft to said wheel, a rigid suspension arm having a support portion supporting said wheel for rotary motion about an axis fixed with respect to said arm, said arm having spaced pivot portions, pivot means connecting one of said pivot portions to said frame, link means connecting the other pivot portion of said arm to said frame, said link means being constructed to support said arm for jounce and rebound pivotal movement, said link means being further constructed to support said other pivot portion for horizontal displacement relative to said frame upon jounce and rebound movement of said arm, a suspension spring interposed between said arm and said frame, said pivot portions having a common pivot axis displaced from said inner joint.

3. A vehicle suspension system having a frame, a differential gear unit secured to said frame, a driving wheel laterally spaced from said gear unit, an axle shaft, an inner universal joint connecting said shaft with the output of said differential gear unit, an outer universal joint drivingly connecting said shaft to said wheel, a rigid suspension arm having a support portion supporting said wheel for rotary motion about an axis fixed with respect to said arm, said arm having spaced pivot portions, first pivot means connecting one of said pivot portions to said frame and constructed to support said one pivot portion for jounce and rebound pivotal movement of said arm, said first pivot means being further constructed to support said one pivot portion for pivotal movement of said arm about a vertical pivot axis, second means dependingly suspending the other pivot portion of said arm from said frame, said second means being constructed to support said other pivot portion for jounce and rebound pivotal movement of said arm and being further constructed to support said other pivot portion for horizontal displacement along an arcuate path relative to said frame upon jounce and rebound movement of said arm, a suspension spring means resiliently supporting said frame upon said wheel, said pivot portions having a common jounce and rebound pivot axis displaced from the inner of said universal joint.

4. A vehicle suspension system having a sprung mass, a road wheel, a laterally extending elongated member of fixed length, an inner joint connecting said member to said sprung mass and an outer joint connecting said member to said wheel, a rigid suspension arm having a support portion supporting said wheel for rotary motion about an axis fixed with respect to said arm, said arm having spaced first and second pivot portions, pivot means connected to said sprung mass and to said first pivot portion and constructed to support said first pivot portion for jounce and rebound pivotal movement of said arm, said pivot means being further constructed to support said first portion for lateral pivot movement of said arm about axis passing through said pivot means, mean dependingly suspending said second pivot portion of said arm from said sprung mass, said just mentioned means being constructed to support said second pivot portion for jounce and rebound pivotal movement of said arm and being further constructed to support said second pivot portion for horizontal displacement along an arcuate path relative to said frame upon jounce and rebound movement of said arm, a suspension spring interposed between said arm and said sprung mass, said pivot portions having a common pivot axis displaced from said inner joint.

5. A vehicle suspension system having a frame, a differential gear unit secured to said frame, a driving wheel laterally spaced from said gear unit, an axle shaft, an inner universal joint connecting said shaft with the output of said differential gear unit, an outer universal joint drivingly connecting said shaft to said wheel, a rigid suspension arm having a support portion supporting said wheel for rotary motion about an axis fixed with respect to said arm, said arm having spaced first and second pivot portions, pivot means connected to said frame and to said first pivot portion and constructed to support said first pivot portion for jounce and rebound pivotal movement of said arm, said pivot means being further constructed to support said first pivot portion for lateral pivotal movement of said arm about a pivot axis passing through said pivot means, means connecting said second pivot portion of said arm to said frame, said just mentioned means comprising a link pivotally connected to said frame and to said second pivot portion, a suspension spring means constructed to resiliently support said frame on said wheel.

6. A vehicle suspension system having a sprung mass, a road wheel, a laterally extending elongated member of fixed length, an inner joint connecting said member to said sprung mass, an outer joint connecting said member to said wheel, a rigid suspension arm having a first portion supporting said wheel for rotary motion about an axis fixed with respect to said arm, means connecting said arm to said sprung mass and constructed to support said arm for jounce and rebound pivotal movement about a pivot axis displaced from said inner joint, said means being further constructed to support said arm for lateral displacement when said wheel, said member and said arm traverse a jounce and rebound path, said means including a link pivotally connected to said sprung mass at one of its ends and pivotally connected to said arm at the other of its ends, a suspension spring interposed between said arm and said sprung mass.

7. A vehicle suspension system having a frame, a differential gear unit secured to said frame, a driving wheel laterally spaced from said gear unit, an axle shaft, an inner universal joint connecting said shaft with the output of said differential gear unit, an outer universal joint drivingly connecting said shaft to said wheel, a rigid suspension arm having a support portion supporting said wheel for rotary motion about an axis fixed with respect to said arm, said arm having spaced first and second pivot portions, pivot means connecting said first pivot portion to said frame, a link means connecting said second pivot portion of said arm to said frame, said link means being constructed to support said second pivot portion for jounce and rebound pivotal movement of said arm and being further constructed to support said second pivot portion for horizontal displacement relative to said frame upon jounce and rebound movement of said arm, said pivot portions having a common pivot axis displaced from said inner joint, a coil spring interposed between said arm and said frame, said coil spring having its axis lying generally in the vertical plane containing the center of said wheel and said link means.

References Cited
UNITED STATES PATENTS

| 3,002,580 | 10/1961 | Mueller et al. | 180—73 |
| 3,020,968 | 2/1962 | Sampietro | 180—73 |

FOREIGN PATENTS

| 434,311 | 4/1948 | Italy. |
| 642,510 | 6/1962 | Canada. |

A. HARRY LEVY, *Primary Examiner.*

BENJAMIN HERSH, *Examiner.*

E. E. PORTER, *Assistant Examiner.*